US012207723B1

(12) United States Patent
Kelley

(10) Patent No.: US 12,207,723 B1
(45) Date of Patent: Jan. 28, 2025

(54) LOTION DISPENSING ASSEMBLY

(71) Applicant: Monica Kelley, Indianapolis, IN (US)

(72) Inventor: Monica Kelley, Indianapolis, IN (US)

( * ) Notice: Subject to any disclaimer, the term of this patent is extended or adjusted under 35 U.S.C. 154(b) by 0 days.

(21) Appl. No.: 18/604,105

(22) Filed: Mar. 13, 2024

(51) Int. Cl.

| | |
|---|---|
| ***A45D 34/04*** | (2006.01) |
| ***A45D 40/26*** | (2006.01) |
| ***B05C 17/02*** | (2006.01) |
| *B05C 17/025* | (2006.01) |

(52) U.S. Cl.
CPC .......... *A45D 34/041* (2013.01); *A45D 40/261* (2013.01); *A45D 2200/1081* (2013.01); *A45D 2200/155* (2013.01); *A45D 2200/207* (2013.01); *B05C 17/0217* (2013.01); *B05C 17/024* (2013.01); *B05C 17/025* (2013.01)

(58) Field of Classification Search
CPC .......... A45D 34/041; A45D 2200/1081; A45D 2200/155; A45D 2200/207; A45D 40/261; A45D 2200/15; A45D 2200/20; B05C 17/02; B05C 17/0217; B05C 17/024; B05C 17/025
USPC ... 401/1, 2, 6, 208, 219, 220, 261, 265, 197
See application file for complete search history.

(56) References Cited

U.S. PATENT DOCUMENTS

| | | | | |
|---|---|---|---|---|
| 5,545,456 | A * | 8/1996 | Suida | A47K 7/022 428/76 |
| 5,564,851 | A * | 10/1996 | Connelly | B05C 17/025 401/6 |
| D418,248 | S | 12/1999 | Clark | |
| 6,017,162 | A | 1/2000 | Call | |
| 7,168,873 | B2 | 1/2007 | Shawan | |
| 11,432,635 | B1 | 9/2022 | Omodele | |
| 11,503,897 | B2 | 11/2022 | Dyer | |
| 2006/0248672 | A1 | 11/2006 | Dussaussoy | |
| 2017/0224576 | A1 | 8/2017 | Thurnbow-Faraci | |

FOREIGN PATENT DOCUMENTS

| | | |
|---|---|---|
| WO | WO2017136697 | 8/2017 |

* cited by examiner

*Primary Examiner* — David J Walczak

(57) ABSTRACT

A lotion dispensing assembly includes a canister that is foraminous to contain and subsequently release a fluid skin treatment. A first handle is rotatably attached to the canister which can be gripped by a user. A second handle is removably attachable to the canister which can be gripped by the user thereby facilitating the user to position the canister against their back to release the fluid skin treatment onto the user's back. A rotation unit is integrated into the canister to rotate the canister on the first handle to evenly apply the fluid skin treatment on the user's back. A heating element is integrated into the canister such that the heating element is in thermal communication with the canister to warm the fluid skin treatment in the canister when the heating element is turned on thereby enhancing comfort for a user.

10 Claims, 5 Drawing Sheets

LOTION DISPENSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dispensing devices and more particularly pertains to a new dispensing device for evenly applying fluid skin treatment to a user's back. The device includes a canister that is foraminous to store and subsequently release the fluid skin treatment to the user's back. The device includes a first handle rotatably attached to the canister and a second handle that is removably attached to the handle to facilitate the user to position the canister behind the user's back. The device includes a rotation unit that is attached to the canister to rotate the canister.

(2) Description of Related Art Including Information Disclosed Under 37 CFR 1.97 and 1.98

The prior art relates to dispensing devices including a lotion roller that includes a foraminous canister that is mounted to a handle and a lotion application devices that each has a fluid permeable element that stores and subsequently released a fluid skin treatment. In no instance does the prior art disclose a lotion dispenser that includes a foraminous canister rotatably attached between a pair of handles and a rotation unit integrated into the canister that rotates the canister to evenly apply lotion to a user.

BRIEF SUMMARY OF THE INVENTION

An embodiment of the disclosure meets the needs presented above by generally comprising a canister that is foraminous to contain and subsequently release a fluid skin treatment. A first handle is rotatably attached to the canister which can be gripped by a user. A second handle is removably attachable to the canister which can be gripped by the user thereby facilitating the user to position the canister against their back to release the fluid skin treatment onto the user's back. A rotation unit is integrated into the canister to rotate the canister on the first handle to evenly apply the fluid skin treatment on the user's back. A heating element is integrated into the canister such that the heating element is in thermal communication with the canister to warm the fluid skin treatment in the canister when the heating element is turned on thereby enhancing comfort for a user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
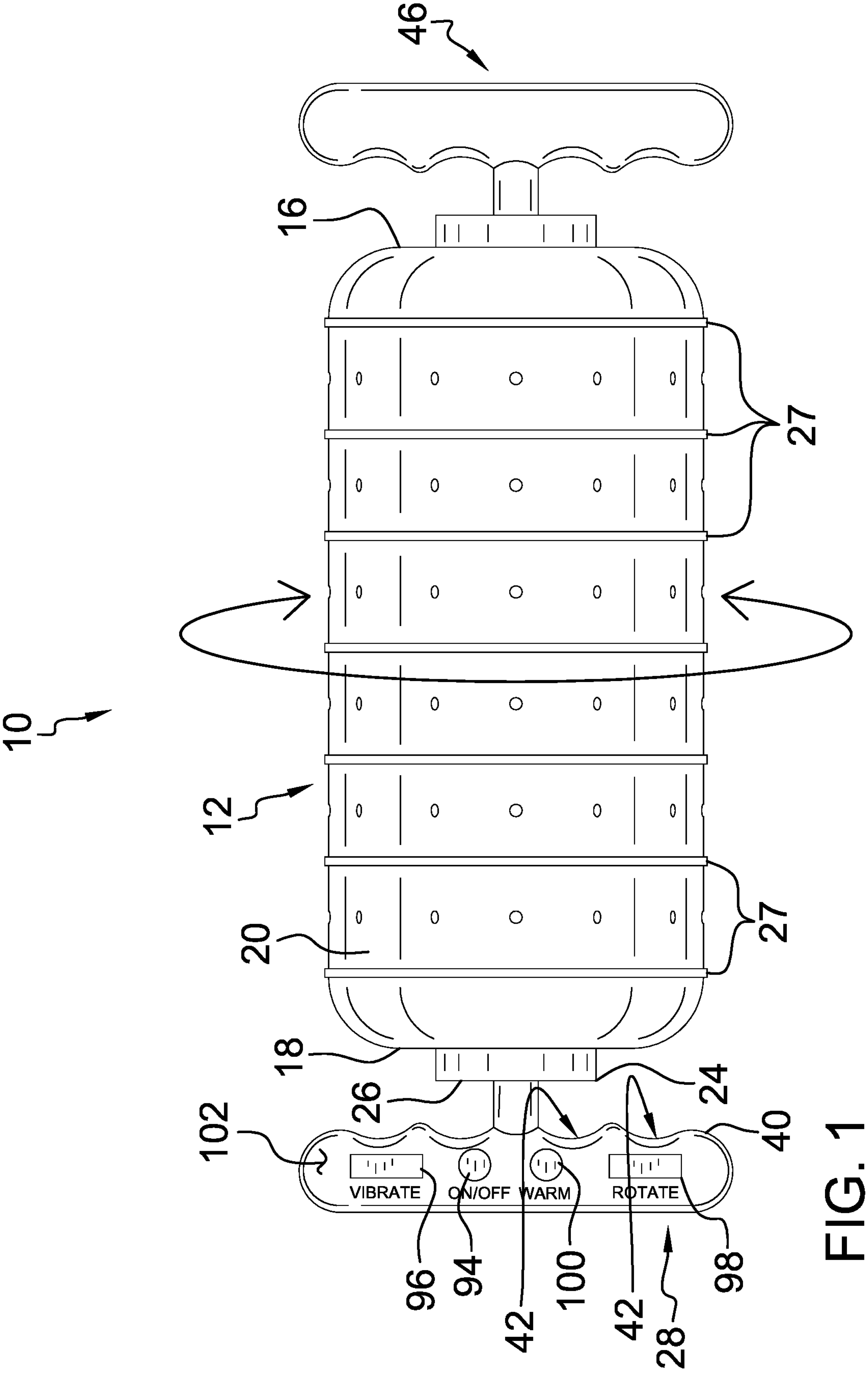
FIG. 1 is a front view of a lotion dispensing assembly according to an embodiment of the disclosure.
Figure 2:
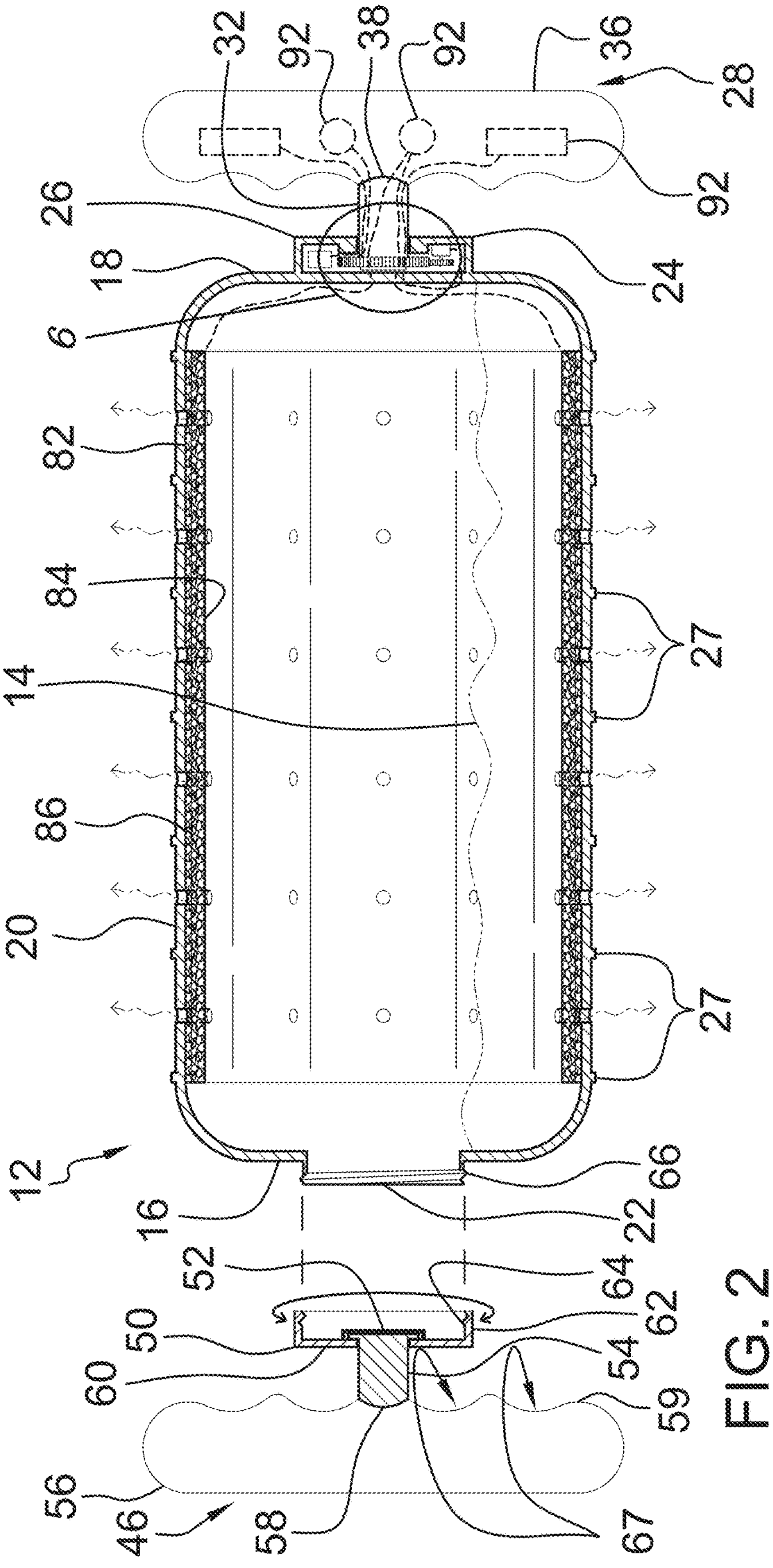
FIG. 2 is a cross sectional view taken along line 2-2 of FIG. 3 of an embodiment of the disclosure.
Figure 4:
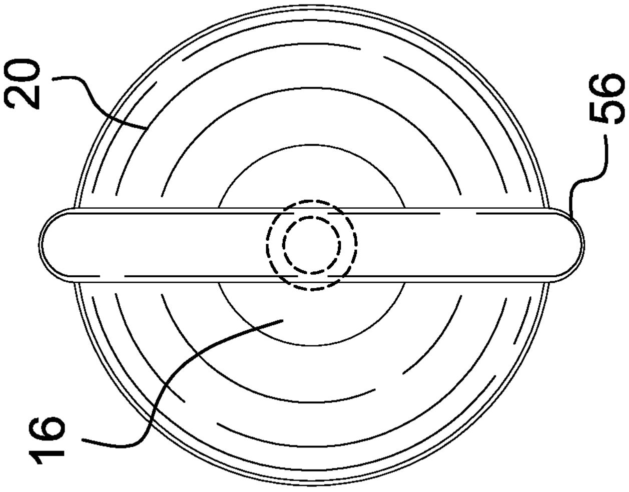
FIG. 4 is a left side phantom view of an embodiment of the disclosure.
Figure 3:
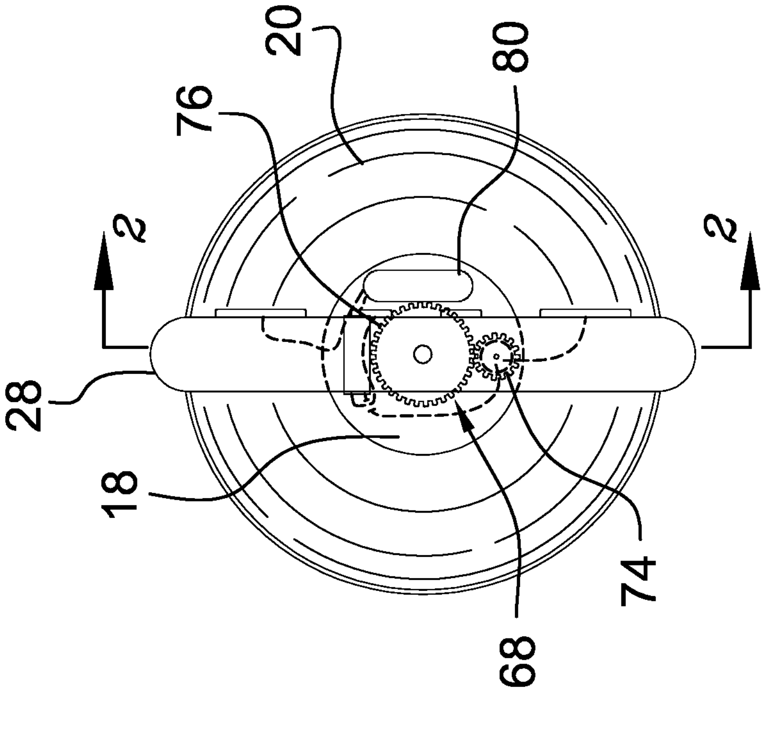
FIG. 3 is a right side phantom view of an embodiment of the disclosure.
Figure 5:
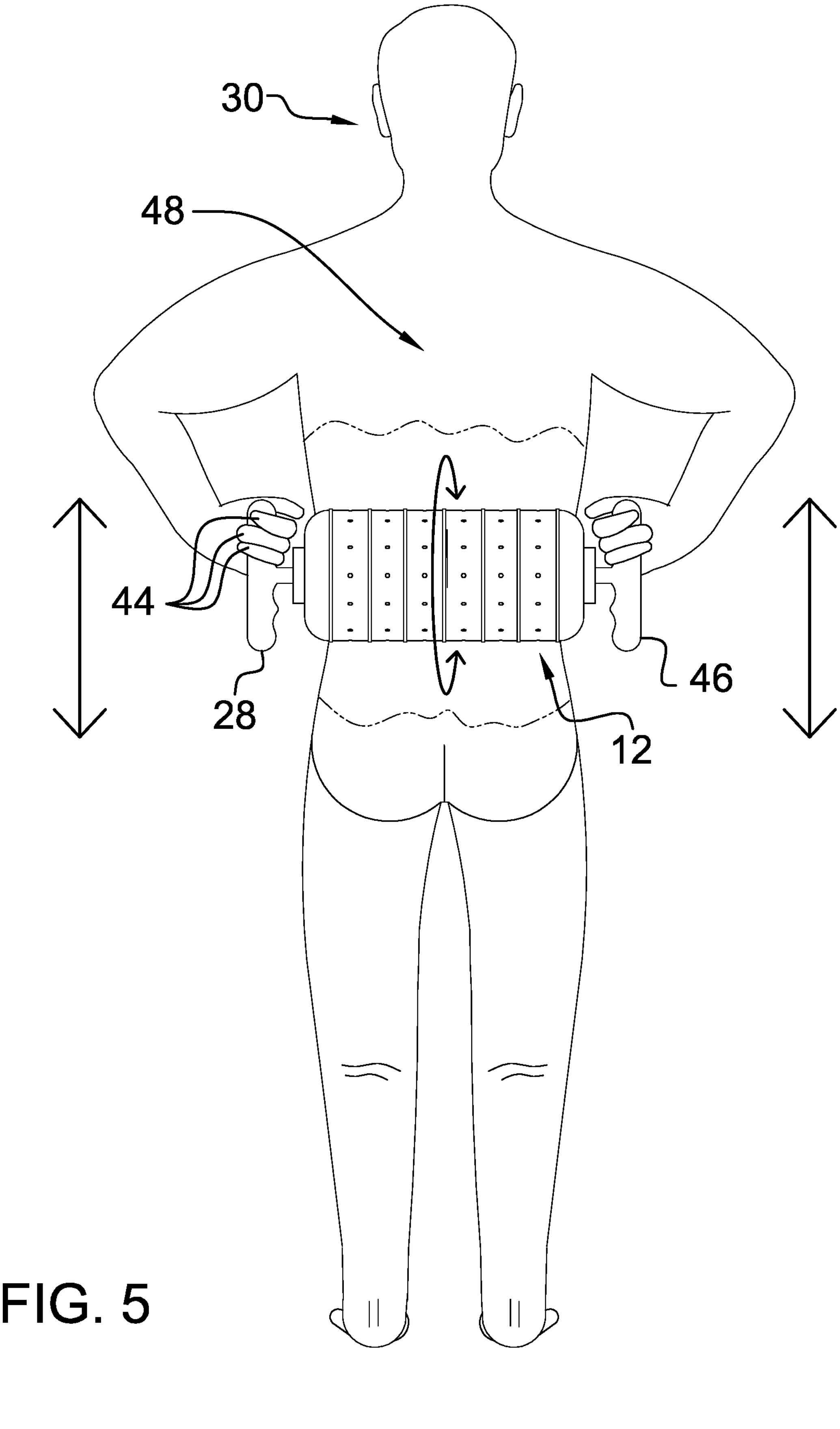
FIG. 5 is a perspective in-use view of an embodiment of the disclosure.
Figure 6:
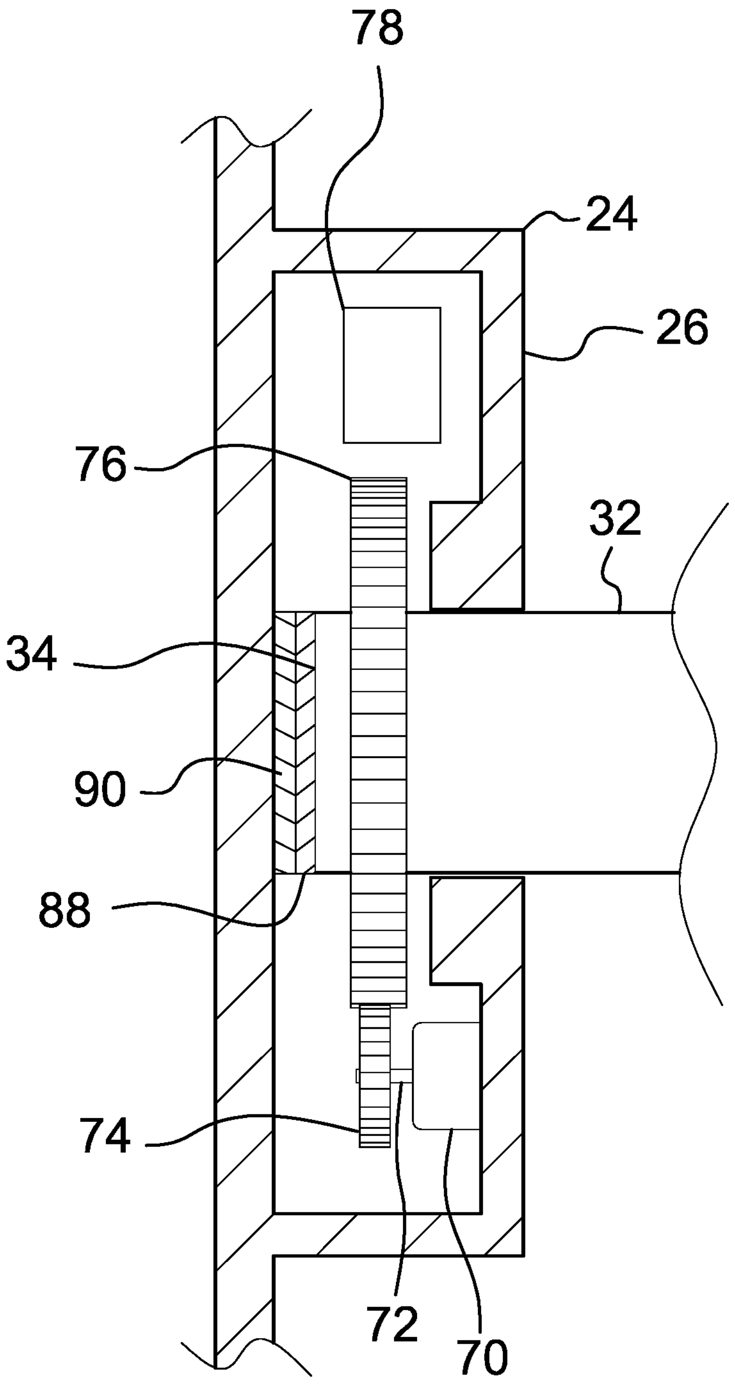
FIG. 6 is a magnified detail view taken from circle 6 of FIG. 2 of an embodiment of the disclosure.

With reference now to the drawings, and in particular to FIGS. 1 through 6 thereof, a new dispensing device embodying the principles and concepts of an embodiment of the disclosure and generally designated by the reference numeral 10 will be described.

As best illustrated in FIGS. 1 through 6, the lotion dispensing assembly 10 generally comprises a canister 12 that is foraminous to facilitate the canister 12 to contain and subsequently release a fluid skin treatment 14. The fluid skin treatment 14 may comprise skin lotion, skin moisturizer or any other type of fluid skin treatment that is commonly employed to improve the health and beauty of human skin. The canister 12 has a first end 16, a second end 18 and an outer wall 20 extending between the first end 16 and the second end 18 and the outer wall 20 is foraminous. The canister 12 has a fill spout 22 that is integrated into the first end 16 to facilitate the canister 12 to be filled with the fluid skin treatment 14. The canister 12 has a gear housing 24 that is disposed on the second end 18 and the gear housing 24 has a distal wall 26 with respect to the second end 18. Additionally, the canister has a plurality of ridges 27 each extending around the outer wall 20 and the ridges 27 are spaced apart from each other and are distributed between the first end 16 and the second end 18.

A first handle 28 is rotatably attached to the canister 12 to facilitate the first handle 28 to be gripped by a user 30. The first handle 28 has a stem 32 extending through the distal wall 26 of the gear housing 24 such that a free end 34 of the stem 32 is positioned within the gear housing 24. Additionally, the first handle 28 has a grip 36 that is perpendicularly oriented with a coupled end 38 of the stem 32 such that the grip 36 is positioned outside of the gear housing 24 for gripping by the user 30. The grip 36 has a bottom edge 40 which undulates to define a plurality of depressions 42 in the bottom edge 40 which accommodate a respective one of the user's fingers 44 for enhancing gripping the grip 36.

A second handle 46 is removably attachable to the canister 12 which can be gripped by the user 30 thereby facilitating the user 30 to position the canister 12 against their back 48 to release the fluid skin treatment 14 onto the user's back 48. The second handle 46 has a cap 50 that is rotatably coupled to a free end 52 of a stem 54 and a grip 56 that is perpendicularly oriented with a coupled end 58 of the stem 54 of the second handle 46. The cap 50 has a sidelong wall 60 and a perimeter wall 62 extending away from the sidelong wall 60 and the perimeter wall 62 is continuously arcuate about a center of the cap 50 such that the cap 50 has a circular shape. Furthermore, an inside surface 64 of the perimeter wall 62 is threaded thereby facilitating the inside surface 64 to threadably engage an exterior surface 66 of the fill spout 22 on the first end 16 of the canister 12 such that the cap 50 closes the fill spout 22. The grip 56 of the second handle 46 has a lower edge 59 which undulates to define a plurality of depressions 67 which accommodate a respective one of the user's fingers 44 for enhancing gripping the grip 56 of the second handle 46.

A rotation unit 68 is integrated into the canister 12 and the rotation unit 68 is in communication with the first handle 28. The rotation unit 68 rotates the canister 12 on the first handle 28 when the rotation unit 68 is turned on to facilitate the fluid skin treatment 14 to be evenly applied on the user's back 48 when the rotation unit 68 is turned on and the canister 12 is positioned against the user's back 48. The rotation unit 68 comprises a motor 70 that is attached to the distal wall 26 of the gear housing 24 having the motor 70 being positioned within the gear housing 24. The motor 70 has an output shaft 72 which is rotated in a first direction when the motor 70 is turned on. Additionally, the motor 70 may comprise a single direction electric motor or the like.

The rotation unit 68 includes a first gear 74 that is attached to the output shaft 72 of the motor 70 such that the first gear 74 is rotated when the motor 70 is turned on. The rotation unit 68 includes a second gear 76 that is positioned around the stem 32 of the first handle 28. The second gear 76 enmeshes with the first gear 74 such that the first gear 74 rotates the second gear 76 when the motor 70 is turned on. In this way the canister 12 is facilitated to rotate around the stem 32 of the first handle 28 when the motor 70 is turned on. Additionally, the second gear 76 has a greater diameter than the first gear 74 thereby decreasing the rotational speed of the canister 12 with respect to the rotational speed of the motor 70. The rotation unit 68 includes a power supply 78 that is positioned within the gear housing 24. The power supply 78 is electrically coupled to the motor 70 and the power supply 78 comprises at least one battery.

A vibration unit 80 is integrated into the canister 12 such that the vibration unit 80 vibrates the canister 12 when the vibration unit 80 is turned on. In this way the vibration unit 80 enhances comfort for the user 30 when the user 30 places the canister 12 against the user's back 48. The vibration unit 80 is positioned within the gear housing 24 such that the vibration unit 80 engages the second end 18 of the canister 12. The vibration unit 80 is electrically coupled to the power supply 78 and the vibration unit 80 may comprise an electric motor and a cam that repeatedly strikes the canister 12 when the electric motor is turned on.

A sponge 82 is positioned within the canister 12 and the sponge 82 extends along an interior surface 84 of the outer wall 20 of the canister 12. In this way the sponge 82 can slow the passage of the fluid skin treatment 14 through the outer wall 20. The sponge 82 extends around a full circumference of the interior surface 84 and the sponge 82 extends substantially between the first end 16 and the second end 18. Furthermore, the sponge 82 may comprise a synthetic sponge, foamed rubber or any other similar type of fluid permeable material.

A heating element 86 is integrated into the canister 12 such that the heating element 86 is in thermal communication with the canister 12. In this way the heating element 86 can warm the fluid skin treatment 14 in the canister 12 when the heating element 86 is turned on thereby enhancing comfort for a user 30. The heating element 86 is positioned between the sponge 82 and the interior surface 84 of the outer wall 20 of the canister 12 and the heating element 86 extends around the full circumference of the interior surface 84. Additionally, the heating element 86 extends substantially between the first end 16 and the second end 18. The heating element 86 may comprise an electrical heating element or the like and the heating element 86 may have an operational temperature ranging between approximately 80.0 degrees fahrenheit and 100.0 degrees fahrenheit.

A first electrical contact 88 is coupled to the free end 34 of the stem 32 of the first handle 28 and the first electrical contact 88 is comprised of an electrically conductive material. The first electrical contact 88 is electrically coupled to the power supply 78 and a second electrical contact 90 is coupled to the second end 18 of the canister 12 such that the second electrical contact 90 is positioned in the gear housing 24. Furthermore, the second electrical contact 90 is comprised of an electrically conductive material such that the second electrical contact 90 is in electrical communication with the first electrical contact 88. The second electrical contact is electrically coupled to the heating element 86 thereby placing the heating element 86 in electrical communication with the power supply 78.

A plurality of control buttons 92 is provided and each of the plurality of control buttons 92 is movably integrated into the first handle 28 which can be manipulated by the user 30. Each of the plurality of control buttons 92 is in communication with a respective one of the rotation unit 68, the vibration unit 80 and the heating element 86 for controlling operational parameters of the rotation unit 68, the vibration unit 80 and the heating element 86. The plurality of control buttons 92 includes a power button 94, a vibrate button 96, a rotate button 98 and a warm button 100. The power button 94 is electrically coupled to the power supply 78 for actuating and de-actuating the power supply 78 and the vibrate button 96 is electrically coupled to the vibration unit 80 for actuating and de-actuating the vibration unit 80. The rotate button 98 is electrically coupled to the rotation unit 68 for actuating and de-actuating the rotation unit 68 and the warm button 100 is electrically coupled to the heating element 86 for actuating and de-actuating the heating element 86. Additionally, each of the plurality of control buttons 92 is positioned on a front surface 102 of the grip 36 of the first handle 28.

In use, the canister 12 is filled with the fluid skin treatment 14 and the cap 50 is attached to the fill spout 22. Each of the first handle 28 and the second handle 46 is gripped and the power button 94 and the rotate button 98 are depressed to turn on the rotation unit 68. In this way the user 30 can position the canister 12 against their back 48 and urge the canister 12 upwardly and downwardly along their back 48 to apply the fluid skin treatment 14 to their back 48. The vibrate button 96 can be depressed to turn on the vibration unit 80 to enhance comfort for the user 30. Additionally, the warm button 100 can be depressed to warm the fluid skin treatment 14 while the fluid skin treatment 14 is being applied to the user's back 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lotion dispensing assembly for facilitating a user to apply lotion to their back without assistance, said assembly comprising:

a canister being foraminous wherein said canister is configured to contain and subsequently release a fluid skin treatment;

a first handle being rotatably attached to said canister wherein said first handle is configured to be gripped by a user;

a second handle being removably attachable to said canister wherein said second handle is configured to be gripped by the user thereby facilitating the user to position said canister against their back to release the fluid skin treatment onto the user's back;

a rotation unit being integrated into said canister, said rotation unit being in communication with said first handle, said rotation unit rotating said canister on said first handle when said rotation unit is turned on wherein said rotation unit is configured to facilitate the fluid skin treatment to be evenly applied on the user's back when said rotation unit is turned on and said canister is positioned against the user's back;

a vibration unit being integrated into said canister such that said vibration unit vibrates said canister when said vibration unit is turned on wherein said vibration unit is configured to enhance comfort for the user when the user places said canister against the user's back;

a heating element being integrated into said canister such that said heating element is in thermal communication with said canister wherein said heating element is configured to warm the fluid skin treatment in said canister when said heating element is turned on thereby enhancing comfort for a user; and a plurality of control buttons, each of said plurality of control buttons being movably integrated into said first handle wherein each of said plurality of control buttons is configured to be manipulated by the user, each of said plurality of control buttons being in communication with a respective one of said rotation unit and said vibration unit and said heating element for controlling operational parameters of said rotation unit and said vibration unit and said heating element.

2. The assembly according to claim 1, wherein:

said canister has a first end and a second end and an outer wall extending between said first end and said second end;

said outer wall is foraminous;

said canister has a fill spout being integrated into said first end wherein said fill spout is configured to facilitate said canister to be filled with the fluid skin treatment;

said canister has a gear housing being disposed on said second end;

said gear housing has a distal wall with respect to said second end;

said first handle has a stem extending through said distal wall of said gear housing such that a free end of said stem is positioned within said gear housing;

said first handle has a grip being perpendicularly oriented with a coupled end of said stem such that said grip is positioned outside of said gear housing wherein said grip is configured to be gripped by the user; and said grip has a bottom edge which undulates to define a plurality of depressions in said bottom edge wherein each of said depressions is configured to accommodate a respective one of the user's fingers for enhancing gripping said grip.

3. The assembly according to claim 2, wherein:

said second handle has a cap being rotatably coupled to a free end of a stem and a grip being perpendicularly oriented with a coupled end of said stem of said second handle;

said cap has a sidelong wall and a perimeter wall extending away from said sidelong wall;

said perimeter wall is continuously arcuate about a center of said cap such that said cap has a circular shape;

an inside surface of said perimeter wall is threaded thereby facilitating said inside surface to threadably engage an exterior surface of said fill spout on said first end of said canister such that said cap closes said fill spout; and said grip of said second handle has a lower edge which undulates to define a plurality of depressions wherein said plurality of depressions in said lower edge is configured to accommodate a respective one of the user's fingers for enhancing gripping said grip of said second handle.

4. The assembly according to claim 2, wherein said rotation unit comprises:

a motor being attached to said distal wall of said gear housing having said motor being positioned within said gear housing, said motor having an output shaft which is rotated in a first direction when said motor is turned on;

a first gear being attached to said output shaft such that said first gear is rotated when said motor is turned on;

a second gear being positioned around said stem of said first handle, said second gear enmeshing with said first gear such that said first gear rotates said second gear when said motor is turned on thereby facilitating said canister to rotate around said stem of said first handle when said motor is turned on; and a power supply being positioned within said gear housing, said power supply being electrically coupled to said motor, said power supply comprising at least one battery.

5. The assembly according to claim 2, further comprising a sponge being positioned within said canister, said sponge extending along an interior surface of said outer wall of said canister wherein said sponge is configured to slow the passage of the fluid skin treatment through said outer wall, said sponge extending around a full circumference of said interior surface, said sponge extending between said first end and said second end.

6. The assembly according to claim 5, wherein said heating element is positioned between said sponge and said interior surface of said outer wall of said canister, said heating element extending around said full circumference of said interior surface, said heating element extending between said first end and said second end.

7. The assembly according to claim 2, further comprising:

a power supply being positioned within said gear housing; and a first electrical contact being coupled to said free end of said stem of said first handle, said first electrical contact being comprised of an electrically conductive material, said first electrical contact being electrically coupled to said power supply.

8. The assembly according to claim 7, further comprising a second electrical contact being coupled to said second end of said canister such that said second electrical contact is positioned in said gear housing, said second electrical contact being comprised of an electrically conductive material such that said second electrical contact is in electrical communication with said first electrical contact, said second electrical contact being electrically coupled to said heating element thereby placing said heating element in electrical communication with said power supply.

9. The assembly according to claim 1, wherein:

said assembly includes a power supply being integrated into said canister;

said plurality of control buttons includes a power button and a vibrate button and a rotate button and a warm button;

said power button is electrically coupled to said power supply for actuating and de-actuating said power supply;

said vibrate button is electrically coupled to said vibration unit for actuating and de-actuating said vibration unit;

said rotate button is electrically coupled to said rotation unit for actuating and de-actuating said rotation unit;

said warm button is electrically coupled to said heating element for actuating and de-actuating said heating element; and each of said plurality of control buttons is positioned on a front surface of said grip of said first handle.

10. A lotion dispensing assembly for facilitating a user to apply lotion to their back without assistance, said assembly comprising:

a canister being foraminous wherein said canister is configured to contain and subsequently release a fluid skin treatment, said canister having a first end and a second end and an outer wall extending between said first end and said second end, said outer wall being foraminous, said canister having a fill spout being integrated into said first end wherein said fill spout is configured to facilitate said canister to be filled with the fluid skin treatment, said canister having a gear housing being disposed on said second end, said gear housing having a distal wall with respect to said second end;

a first handle being rotatably attached to said canister wherein said first handle is configured to be gripped by a user, said first handle having a stem extending through said distal wall of said gear housing such that a free end of said stem is positioned within said gear housing, said first handle having a grip being perpendicularly oriented with a coupled end of said stem such that said grip is positioned outside of said gear housing wherein said grip is configured to be gripped by the user, said grip having a bottom edge which undulates to define a plurality of depressions in said bottom edge wherein each of said depressions is configured to accommodate a respective one of the user's fingers for enhancing gripping said grip;

a second handle being removably attachable to said canister wherein said second handle is configured to be gripped by the user thereby facilitating the user to position said canister against their back to release the fluid skin treatment onto the user's back, said second handle having a cap being rotatably coupled to a free end of a stem and a grip being perpendicularly oriented with a coupled end of said stem of said second handle, said cap having a sidelong wall and a perimeter wall extending away from said sidelong wall, said perimeter wall being continuously arcuate about a center of said cap such that said cap has a circular shape, an inside surface of said perimeter wall being threaded thereby facilitating said inside surface to threadably engage an exterior surface of said fill spout on said first end of said canister such that said cap closes said fill spout, said grip of said second handle having a lower edge which undulates to define a plurality of depressions wherein said plurality of depressions in said lower edge is configured to accommodate a respective one of the user's fingers for enhancing gripping said grip of said second handle;

a rotation unit being integrated into said canister, said rotation unit being in communication with said first handle, said rotation unit rotating said canister on said first handle when said rotation unit is turned on wherein said rotation unit is configured to facilitate the fluid skin treatment to be evenly applied on the user's back when said rotation unit is turned on and said canister is positioned against the user's back, said rotation unit comprising:

a motor being attached to said distal wall of said gear housing having said motor being positioned within said gear housing, said motor having an output shaft which is rotated in a first direction when said motor is turned on;

a first gear being attached to said output shaft such that said first gear is rotated when said motor is turned on;

a second gear being positioned around said stem of said first handle, said second gear enmeshing with said first gear such that said first gear rotates said second gear when said motor is turned on thereby facilitating said canister to rotate around said stem of said first handle when said motor is turned on; and a power supply being positioned within said gear housing, said power supply being electrically coupled to said motor, said power supply comprising at least one battery;

a vibration unit being integrated into said canister such that said vibration unit vibrates said canister when said vibration unit is turned on wherein said vibration unit is configured to enhance comfort for the user when the user places said canister against the user's back, said vibration unit being positioned within said gear housing such that said vibration unit engages said second end of said canister, said vibration unit being electrically coupled to said power supply;

a sponge being positioned within said canister, said sponge extending along an interior surface of said outer wall of said canister wherein said sponge is configured to slow the passage of the fluid skin treatment through said outer wall, said sponge extending around a full circumference of said interior surface, said sponge extending between said first end and said second end;

a heating element being integrated into said canister such that said heating element is in thermal communication with said canister wherein said heating element is configured to warm the fluid skin treatment in said canister when said heating element is turned on thereby enhancing comfort for a user, said heating element being positioned between said sponge and said interior surface of said outer wall of said canister, said heating element extending around said full circumference of said interior surface, said heating element extending between said first end and said second end;

a first electrical contact being coupled to said free end of said stem of said first handle, said first electrical contact being comprised of an electrically conductive material, said first electrical contact being electrically coupled to said power supply;

a second electrical contact being coupled to said second end of said canister such that said second electrical contact is positioned in said gear housing, said second electrical contact being comprised of an electrically conductive material such that said second electrical contact is in electrical communication with said first electrical contact, said second electrical contact being electrically coupled to said heating element thereby placing said heating element in electrical communication with said power supply; and a plurality of control buttons, each of said plurality of control buttons being movably integrated into said first handle wherein each of said plurality of control buttons is configured to be manipulated by the user, each of said plurality of control buttons being in communication with a respective one of said rotation unit and said vibration unit and said heating element for controlling operational parameters of said rotation unit and said vibration unit and said heating element, said plurality of control buttons including a power button and a vibrate button and a rotate button and a warm button, said power button being electrically coupled to said power supply for actuating and de-actuating said power supply, said vibrate button being electrically coupled to said vibration unit for actuating and de-actuating said vibration unit, said rotate button being electrically coupled to said rotation unit for actuating and de-actuating said rotation unit, said warm button being electrically coupled to said heating element for actuating and de-actuating said heating element, each of said plurality of control buttons being positioned on a front surface of said grip of said first handle.

* * * * *